G. T. Montague,
Churn.

No. 104,627. Patented June 21, 1870.

Witnesses.
Wm Ruddick
D. H. Armaber

Inventor
Geo. T. Montague

United States Patent Office.

GEORGE THRELKELD MONTAGUE, OF KEOKUK, IOWA.

Letters Patent No. 104,627, dated June 21, 1870.

IMPROVEMENT IN CHURN-POWER.

The Schedule referred to in these Letters Patent and making part of the same

*To all whom it may concern:*

Be it known that I, GEORGE THRELKELD MONTAGUE, of Keokuk, Lee county, Iowa, have made a new and useful Improvement in Churn-Powers; and I declare the following to be a full, clear, and exact description thereof, reference being had to the accompanying drawing and to the letters of reference marked thereon, in which—

Figure 1:
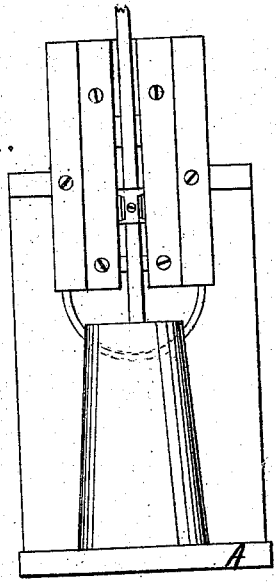
Figure 1 is a vertical section of my apparatus.
Figure 2:
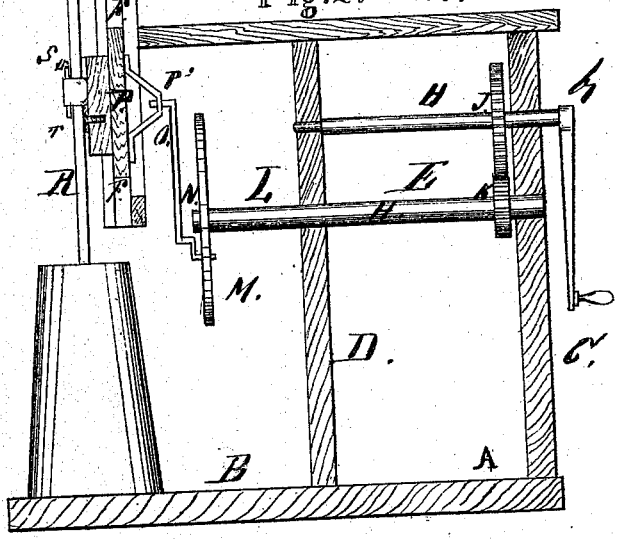
Figure 2 is a horizontal section of a part of the same, taken on line W-X of fig. 1.

The object of this invention is simply to provide a mechanical apparatus to move the ordinary hand churn-dash, with an accelerated speed, and considerable advantage of ease.

The apparatus is made and used substantially as shown and set forth.

A is a base-board, lying flat on the floor, with an upright frame from it, consisting of upright parts C and D, and a top piece, E, bearing an overhanging head-part, F, directly above the point B on the board A, where the churn, of any ordinary and suitable shape, may be placed, R representing a part of the handle of its upright dasher.

The two parts C and D hold through them two horizontal shafts, H and L, with gearing between them, so that, when H is turned by the hand-cranks G, L will be turned very much faster, with its flywheel M, which bears a crank-pin, N.

From crank-pin N reaches upward a pitman or thrusting-shaft, O, which connects to another pin or point, P', so that it will be thrust up and down by the revolution of the fly-wheel M.

In the part F is a part, P, resting or fitting into an upright slot-way in it, which has sunken channels, F' F''', up and down on the two sides, into which guides on part P fit and play, so as to be held true and in place as the part P is thrust up and down.

The part P has a bifurcated part, T, on its front, to receive the handle of the churn-dash R, which a clamp, U, and screw, S, attaches to it, so as to be forcibly drawn up and down, to give the corresponding motions, suitably to the dasher for churning in the ordinary manner, much faster than the crank G, which thus moves it, is turned, the action of the flywheel M, with the crank G, greatly facilitating and saving the labor of the churning.

Some modifications may be made in the construction.

What I claim, is—

The arrangement of the base-board A, resting upon the floor and receiving the churn, with the uprights C and D, and the head F, the moving parts H, L, P, and S, and overhanging the position of the churn on board A, substantially as set forth, to form a churn-power.

GEORGE THRELKELD MONTAGUE.

Witnesses:
SAMUEL JACOB WALLACE,
WM. RUDDICK.